United States Patent [19]

Ash

[11] 4,347,615
[45] Aug. 31, 1982

[54] TRANSVERSAL EQUALIZERS
[75] Inventor: Christopher P. Ash, Caversham, England
[73] Assignee: Plessey Overseas Limited, Ilford, England
[21] Appl. No.: 187,827
[22] Filed: Sep. 16, 1980
[30] Foreign Application Priority Data
Sep. 19, 1979 [GB] United Kingdom ................ 7932403
[51] Int. Cl.³ ...................... H04L 25/03; H03K 5/159; H04B 3/04
[52] U.S. Cl. .......................................... 375/14; 333/18
[58] Field of Search .......................... 333/18; 364/724; 375/11-17

[56] References Cited
U.S. PATENT DOCUMENTS

| | | | |
|---|---|---|---|
| 3,597,541 | 8/1971 | Proakis | 375/12 |
| 3,697,875 | 10/1972 | Guanella | 375/12 |
| 3,949,206 | 4/1976 | Edwards et al. | 375/11 |
| 3,992,616 | 11/1976 | Acker | 364/724 |
| 4,011,405 | 3/1977 | Ridout et al. | 375/17 |

OTHER PUBLICATIONS

Proceedings of the IEEE; vol. 65, No. 3, Mar. 1977, pp. 444-453, "Echo Cancellation on Time-Variant Circuits", Nicholas Demytko and Kevin S. English.

Primary Examiner—Benedict V. Safourek
Attorney, Agent, or Firm—Fleit & Jacobson

[57] ABSTRACT

The presence of a d.c. offset in the input signal to an adaptive equalizer for a high speed modem must be removed before a valid signal enters the equalizer if the "coefficient up-date" algorithm for the equalizer is not to be confused. Normally the d.c compensation is achieved using adjust-on-test resistors or potentiometers which provide for in life adjustments to compensate for ageing drift. The submission envisages the use of an additional adaptive equalizer tap-stage connected to a fixed voltage source. This voltage is multiplied by the additional tap-stage multiplier and summed with the outputs of the other tap-stages in the equalizers accumulator. The error produced from the equalizer decision circuit is correlated with the fixed voltage in the additional tap-stage correlator the output of which controls the gain of the additional tap-stage multiplier thereby compensating for the original d.c. offset of the output of the equalizer accumulator.

2 Claims, 2 Drawing Figures

TRANSVERSAL EQUALIZERS

The present invention relates to transversal equalisers and more particularly d.c. compensation in adaptive equalisers.

The presence of a d.c. offset in an input signal to an adaptive equaliser causes confusion in the coefficient update algorithm because the error signal does not correlate properly with the data signal samples at each tap of the equaliser. The d.c. offset in the input signal has therefore to be reduced to zero before the signal enters the equaliser. This is normally accomplished by using adjust-on-test resistors or potentiometers providing in-life adjustments to correct for ageing drift in analogue components such as operational amplifiers, sample-and-hold circuits and the analogue-to-digital converter itself.

According to the present invention there is provided an adaptive equaliser including a plurality of tap stages, the first stage receives an input signal and subsequent stages receive time spaced samples of the input signal and each stage includes a multiplier and a correlator both of which are fed by an input signal, the output signal from the multiplier are summed by an accumulator which applies a signal to a decision circuit providing an output signal and an error signal, the latter is applied to each correlator to correct residual error, said adaptive equaliser includes an additional tap stage having its respective multiplier and correlator connected to a fixed voltage source, the output signal from the multiplier is summed with the other multiplier output signals by said accumulator and the error signal produced by said decision circuit is correlated with said fixed voltage by the additional correlator to control the gain of the additional tap stage multiplier thereby compensating for an original d.c. offset in the input signal.

According to a feature of the invention the adaptive equaliser finds application in modulator/demodulator equipment commonly known as modems.

The invention will be readily understood from the following exemplary embodiment thereof and should be read in conjunction with the following drawing wherein.

Figure 1:
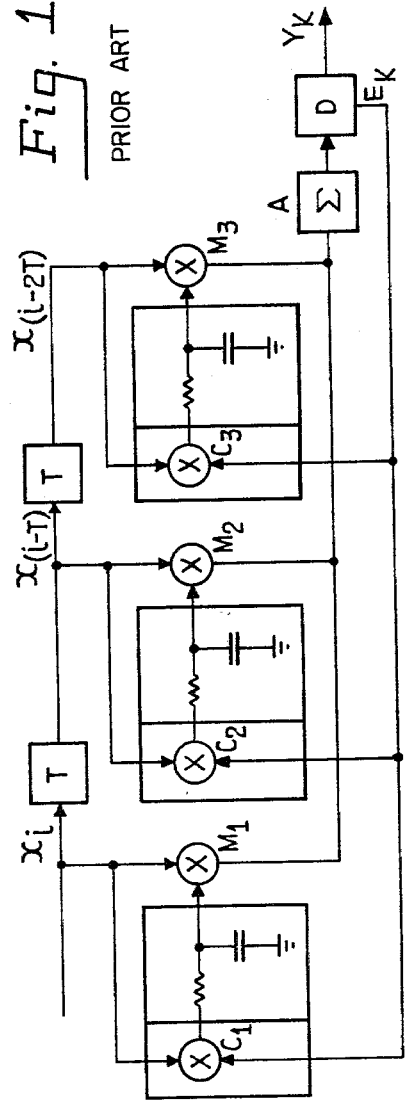
FIG. 1 shows a known form of adaptive equaliser.

Referring to FIG. 1, the time-spaced samples of the input signal are provided by delay lines T. The input signal xi, and the time-spaced samples x(i-T), x(i-2T) are multiplied by the four-quadrant multipliers M1, M2, and M3 respectively and then summed in an accumulator A. The output of accumulator A is fed to decision circuit D and compared with a set of reference levels or with a locally generated reference signal to produce an output signal $Y_K$ and error signal $E_K$. The error signal $E_K$ is correlated with the signal samples in the correlators C1, C2 and C3 respectively, the outputs of which control the gains of associated multipliers $M_1$, $M_2$ and $M_3$ to minimise the correlation of each tap stage.

If there is a d.c. offset in the input signal the correlators $C_1$, $C_2$ and $C_3$ will attempt to correct the residual error, but since there is no linear relationship between the d.c. offset and the signal samples the effect of this attempt to remove the d.c. offset will result in non-optimum settings for the multipliers $M_1$, $M_2$ and $M_3$ and distortion in the output signal $Y_K$ will occur.

Figure 2:
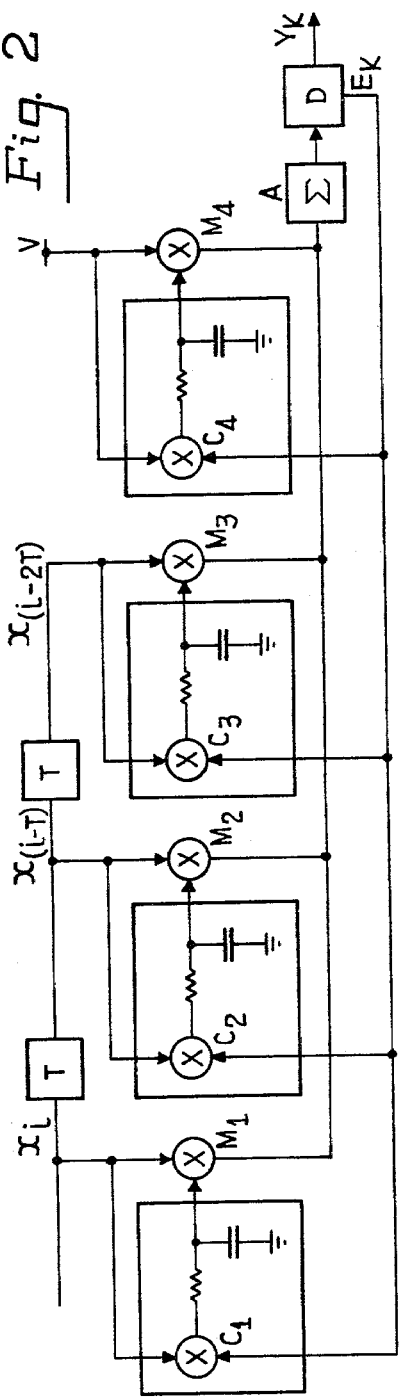
FIG. 2 shows an adaptive equaliser in accordance with the present invention.

Referring to FIG. 2 an equaliser according to the invention is shown and functions as described with reference to FIG. 1, but includes a fourth tap stage connected to a fixed voltage source V. The voltage V is multiplied by a multiplier $M_4$ and summed with the outputs of multipliers $M_1$, $M_2$ and $M_3$ by accumulator A. The error signal $E_K$ is correlated with the fixed voltage V in the correlator $C_4$. The output of correlator $C_4$ is used to control the gain of multiplier $M_4$ until the d.c. offset of the output of accumulator A is reduced to zero, allowing multipliers $M_1$, $M_2$ $M_3$ to assume their optimum gain values.

The above description has been of one embodiment only and is not intended to limit the scope of the invention.

For example, the invention could be applied to adaptive equalisers having complex-valued tap gain coefficients by having two additional taps as described, one to remove the d.c. in the inphase channel and one to remove the d.c. in the so-called Quadradure channel.

What we claim is:

1. An adaptive equaliser receiving an input signal susceptible to an original d.c. offset, and comprising in combination:

a plurality of stages, including second and subsequent stages which include a tapped delay line providing a time-spaced sample of the input signal applied to a first stage of the plurality of stages, and wherein each stage further includes a correlator and a multiplier, the correlator and the multiplier of the first stage being arranged to receive the input signal, and the correlator and the multiplier of the second and subsequent stages being arranged to receive the respective time-spaced sample of the input signal, each said correlator further receiving an error signal and providing an output signal to its respective said multiplier, said respective multiplier being arranged to provide a further output signal;

accumulator means for receiving and summing the further output signals from the multipliers to provide a summation output signal;

a further stage including a fixed voltage source, a further correlator and a further multiplier, each having an input connected to said fixed voltage source, said further correlator receiving the error signal and provide a further output signal to the further multiplier, said further multiplier providing a multiplier output signal to said accumulator, said accumulator summing said multiplier output signal of said further multiplier with said further output signals of said multipliers; and decision circuit means for receiving the summation output signal from said accumulator means and for comparing said summation output signal with a reference signal to provide a decision output signal and said error signal, said error signal being applied to said correlators to correct residual error, and to the further correlator of said further stage to control the gain of the further multiplier, whereby to compensate for the original d.c. offset in the input signal.

2. An adaptive equaliser as claimed in claim 1, wherein the further correlator of the further stage controls the gain of the further multiplier of the further stage until the d.c. offset is reduced to zero, whereby the multipliers of the other stages assume their optimum gain values.

* * * * *